(12) United States Patent
Moniz et al.

(10) Patent No.: US 8,016,561 B2
(45) Date of Patent: Sep. 13, 2011

(54) GAS TURBINE ENGINE FAN ASSEMBLY AND METHOD FOR ASSEMBLING TO SAME

(75) Inventors: Thomas Ory Moniz, Loveland, OH (US); Jorge Francisco Seda, Cincinnati, OH (US); Justin Paul Stephenson, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 11/456,644

(22) Filed: Jul. 11, 2006

(65) Prior Publication Data

US 2008/0014095 A1 Jan. 17, 2008

(51) Int. Cl.
*F01D 5/18* (2006.01)
(52) U.S. Cl. .................. 416/97 R; 415/115; 415/119
(58) Field of Classification Search .................. 415/115, 415/119; 416/97 R
See application file for complete search history.

(56) References Cited

U.S. PATENT DOCUMENTS

| 2,920,865 | A | * | 1/1960 | Lombard | 416/97 R |
|---|---|---|---|---|---|
| 6,004,095 | A | * | 12/1999 | Waitz et al. | 415/119 |
| 6,739,120 | B2 | * | 5/2004 | Moniz et al. | 60/226.1 |
| 2004/0060279 | A1 | * | 4/2004 | Robert Joseph et al. | 60/226.1 |

* cited by examiner

*Primary Examiner* — Edward Look
*Assistant Examiner* — Dwayne J White
(74) *Attorney, Agent, or Firm* — William Scott Andes, Esq.; Armstrong Teasdale LLP (57) ABSTRACT

A method for operating a turbofan engine includes providing a first fan disk configured to rotate in a first rotational direction, coupling a first fan blade to the first fan disk, the first fan blade including a dovetail, an airfoil coupled to the dovetail, and a plurality of channels extending through the dovetail, and channeling airflow through the at least one fan blade such that the airflow is discharged from the airfoil trailing edge to facilitate reducing the operational noise level of the turbofan engine and improve.

14 Claims, 8 Drawing Sheets

GAS TURBINE ENGINE FAN ASSEMBLY AND METHOD FOR ASSEMBLING TO SAME

BACKGROUND OF THE INVENTION

This invention relates generally to turbofan engines, and more particularly to a method and apparatus for reducing the operational noise level of the turbofan engine.

Turbofan gas turbine engines typically include a fan assembly that channels air to a core gas turbine engine and to a bypass duct. The core gas turbine engine includes a high-pressure compressor, a combustor, and at least one turbine. The compressor compresses airflow channeled from the fan assembly and delivers the compressed air to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight.

During operation, the fan operates similarly to a propeller by supplying air downstream to the gas turbine engine and also pushing air through the exhaust nozzle at an increased velocity to provide thrust for the aircraft. As such, airflow exiting the fan is split into two different separate paths generally referred to as the fan duct stream and the core duct stream. More specifically, the fan imparts a swirling motion to the air prior to the air being channeled through the fan duct. This swirling motion may cause a loss of momentum before the air exits the exhaust nozzle. Accordingly, at least some known turbofan engines include a set of stator vanes to facilitate reducing the air swirling motion before the bypass duct. However, the airflow impacting the stator vanes may cause an increase in noise emissions. For example, fan air impacts the stator vanes at the rate of blades passing by and generates a tone often referred to as the blade passage frequency (BPF). Moreover, the unsteadiness in the fan flow may interact with the stators to create broadband noise. As larger turbofan engines with higher bypass ratios are produced to address the need for increased thrust requirements at low levels of specific fuel consumption, the fan becomes the predominant source of noise emanating from the engine. Several attempts have been made to reduce fan noise in turbofan engines as the international recognition of the need to limit or reduce engine noise level increases, particularly for communities living near airports. However, known attempts to address this important problem have involved indirect remedies that do not directly affect the source of the problem with clear undesirable side effects, such as added engine weight. Therefore, a need exists for turbofan engines producing a substantially reduced level of noise while maintaining desired performance levels at potentially reduced overall engine weight.

BRIEF DESCRIPTION OF THE INVENTION

In one aspect, a method for operating a turbofan engine is provided. The method includes providing a first fan disk configured to rotate in a first rotational direction, coupling a first fan blade to the first fan disk, the first fan blade including a dovetail, an airfoil coupled to the dovetail, and a plurality of channels extending through the dovetail, and channeling airflow through at least one fan blade such that the airflow is discharged from the airfoil trailing edge to facilitate reducing the operational noise level of the turbofan engine.

In another aspect, a turbofan engine fan blade is provided. The fan blade includes a dovetail, an airfoil coupled to the dovetail, the airfoil comprising a first sidewall and a second sidewall, the first and second sidewalls coupled at a leading edge and an axially trailing edge, a plurality of airflow channels extending through the dovetail, the airflow channels configured to receive compressed airflow and discharge the compressed air proximate to the fan blade airfoil trailing edge.

In a further aspect, a turbofan engine assembly is provided. The turbofan engine assembly includes a first fan assembly comprising a plurality of fan blades, at least one of the fan blades comprising a dovetail, an airfoil coupled to the dovetail, the airfoil comprising a first sidewall and a second sidewall, the first and second sidewalls coupled at a leading edge and an axially trailing edge, and a plurality of airflow channels extending through the dovetail, the airflow channels configured to receive compressed airflow and discharge the compressed air proximate to the airfoil trailing edge, and a turbine coupled to the first fan assembly.

DETAILED DESCRIPTION OF THE INVENTION

Figure 1:
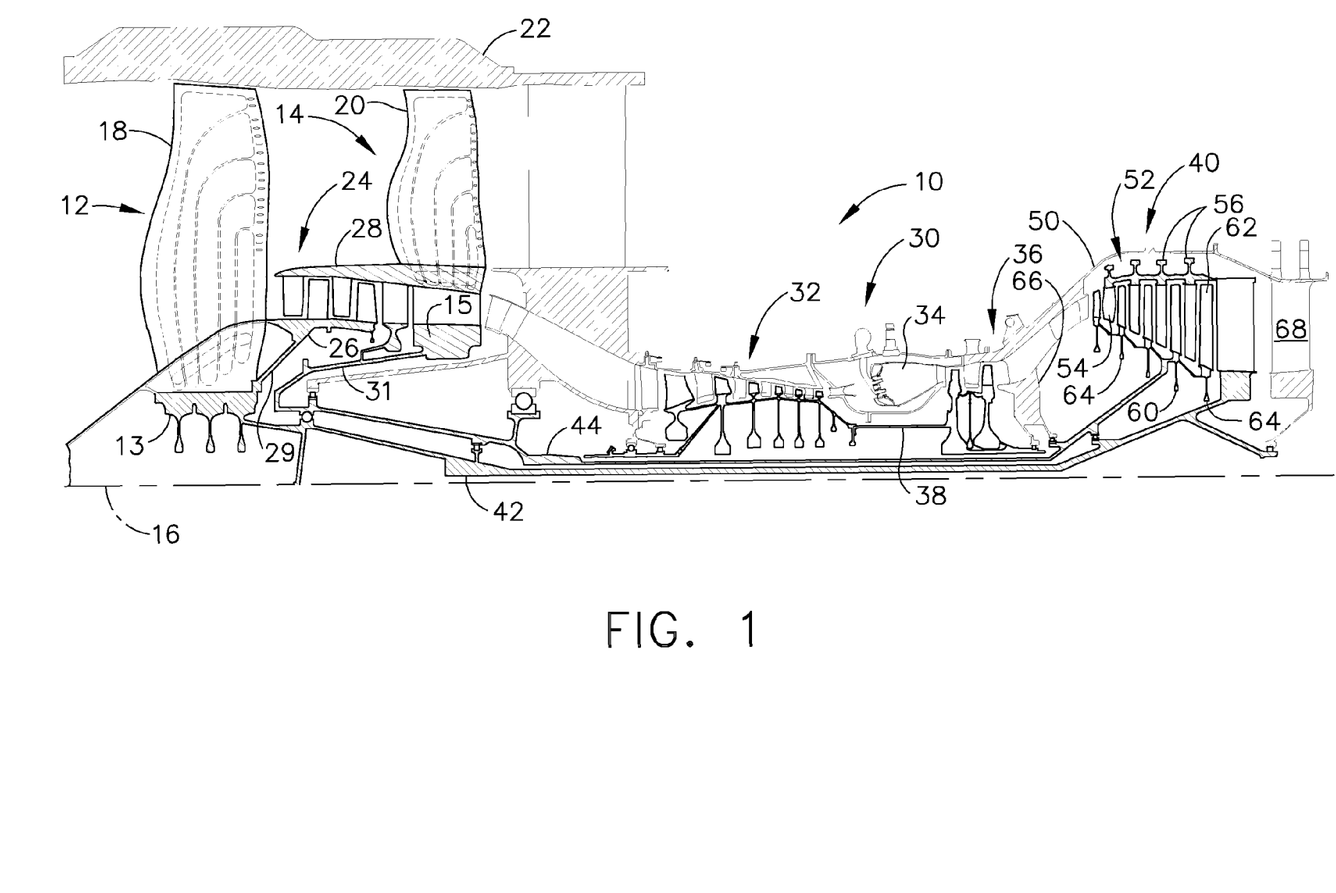
FIG. 1 is a cross-sectional view of an exemplary turbofan engine.

FIG. 1 is a cross-sectional view of a portion of an exemplary turbofan engine assembly 10 that includes a forward fan assembly 12 and an aft fan assembly 14 disposed about a longitudinal centerline axis 16. The terms "forward fan" and "aft fan" are used herein to indicate that fan assembly 12 is coupled axially upstream from fan assembly 14. In one embodiment, fan assemblies 12 and 14 are positioned at a forward end of turbofan engine 10 as illustrated. In an alternative embodiment, fan assemblies 12 and 14 are positioned at an aft end of turbofan engine 10. Fan assemblies 12 and 14 each include respective rotor disks 13 and 15 and a plurality of fan blades 18 and 20 that are coupled to each respective rotor disk. Fan assemblies 12 and 14 are each positioned within a nacelle 22. Turbofan engine assembly 10 also includes a booster compressor 24. In the exemplary embodiment, booster compressor 24 includes a radially inner rotor section 26 having a plurality of rows of blades, and a counter-rotating, radially outer rotor section 28 having a plurality of rows of blades. In the exemplary embodiment, inner rotor section 26 is coupled to forward fan assembly 12, via a forward booster arm 29, and thus rotates in the same rotational direction and at the same rotational speed as forward fan assembly 12, and outer rotor section 28 is coupled to aft fan assembly 14, via an aft fan assembly disk 31, and thus rotates at the same rotational speed and in the same rotational direction as aft fan assembly 14. In the exemplary embodiment, booster 24 is positioned axially downstream from forward fan assembly 12 such that booster 24 is between fan assembly 12 and fan assembly 14.

Turbofan engine 10 also includes a core gas turbine engine 30 that is downstream from fan assemblies 12 and 14. Core gas turbine engine 30 includes a high-pressure compressor 32, a combustor 34, and a high-pressure turbine 36 that is coupled to high-pressure compressor 32 via a shaft 38. In operation, core gas turbine engine 30 generates combustion gases that are channeled downstream to high-pressure turbine 36 and a counter-rotating low-pressure turbine 40, which extracts energy from the gases for powering fan assemblies 12 and 14 through respective shafts 42 and 44.

Low-pressure turbine 40 includes a stationary outer casing 50 that is coupled to core engine 30 downstream from high-pressure turbine 36. Low-pressure turbine 40 also includes a radially outer rotor section 52 that is positioned radially inwardly of outer casing 50. Outer rotor section 52 has a generally frusto-conical shape and includes a plurality of circumferentially spaced rotor blades 54 that are coupled to, and extend radially inwardly from, a respective rotor disk 56. Although, the exemplary embodiment only illustrates four rotor disks 56, it should be realized that outer rotor 52 may have any quantity of rotor disks 56 without affecting the scope of the method and apparatus described herein.

Low-pressure turbine 40 also includes a radially inner rotor section 60 that is aligned substantially coaxially with respect to, and radially inward of, outer rotor section 52. Inner rotor 60 includes a plurality of circumferentially spaced rotor blades 62 that are coupled to, and extend radially outwardly from, a respective rotor disk 64. Although, the exemplary embodiment only illustrates five rotor disks 64, it should be realized that inner rotor 60 may have any quantity of rotor disks 64 without affecting the scope of the method and apparatus described herein. In the exemplary embodiment, inner rotor 60 is rotatably coupled to aft fan assembly 14 via shaft 44 and also to turbine midframe 66 which provides structural support for inner rotor 60. Outer rotor 52 is rotatably coupled to a forward fan assembly 12 via shaft 42 and also to turbine rear-frame 68 which provides rotational support to outer rotor 52.

In the exemplary embodiment, inner rotor blades 62 extending from a respective rotor disk 64 are axially inter-digitated with outer rotor blades 54 extending from a respective rotor disk 56 such that inner rotor blades 62 extend between respective outer rotor blades 54. The blades 54 and 62 are therefore configured for counter-rotation of the rotors 52 and 60. In one preferred embodiment, low-pressure turbine outer rotor 52, forward fan assembly 12, and booster compressor inner rotor 26 are configured to rotate in a first rotational direction, and low-pressure turbine inner rotor 60, booster compressor outer rotor 28, and aft fan assembly 14 are configured to rotate in a second opposite direction.

Figure 2:
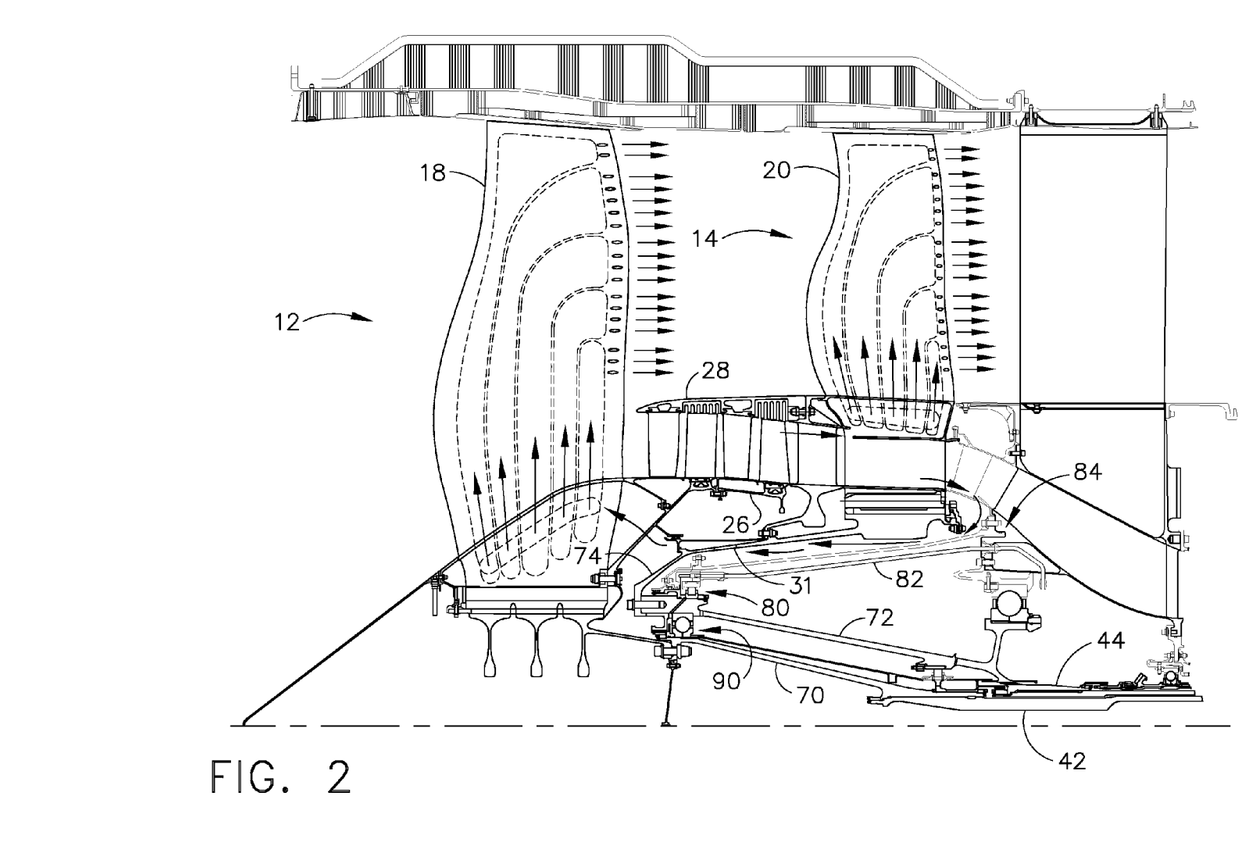
FIG. 2 is a cross-sectional view of a portion of the turbofan engine shown in FIG. 1.

FIG. 2 is a cross-sectional view of a forward portion of turbofan engine assembly 10 shown in FIG. 1. As shown in FIG. 2, forward fan assembly 12 and booster compressor inner rotor 26 are each coupled to shaft 42 utilizing a first cone 70, and second fan assembly 14 and booster compressor outer rotor 28 are coupled to shaft 44 utilizing a second cone 72. More specifically, a forward end of cone 70 is coupled to first fan assembly 12 and an rearward end of cone 70 is coupled to shaft 42. Moreover, a forward end of cone 72 is coupled to aft fan assembly disk 31 and a radially rearward end of cone 72 is coupled to drive shaft 44.

In the exemplary embodiment, turbofan engine 10 also includes a first fan bearing assembly 80 that is utilized to provide radial support to aft fan assembly 14 and booster compressor outer rotor 28. More specifically, and in the exemplary embodiment, first fan bearing assembly 80 includes a bearing support 82 that is fixedly coupled between first fan bearing assembly 80 and a structural component of turbofan engine assembly 10, such as for example, a fan frame 84. Turbofan engine assembly 10 also includes a second fan bearing assembly 90 that is positioned between cone 70 and cone 72 to support forward fan assembly 12 and booster compressor inner rotor 26. In the exemplary embodiment, bearing assembly 90 is a thrust bearing assembly that includes a plurality of rolling elements to facilitate maintaining both forward and aft fan assemblies 12 and 14 in a substantially fixed axial position.

Figure 3:
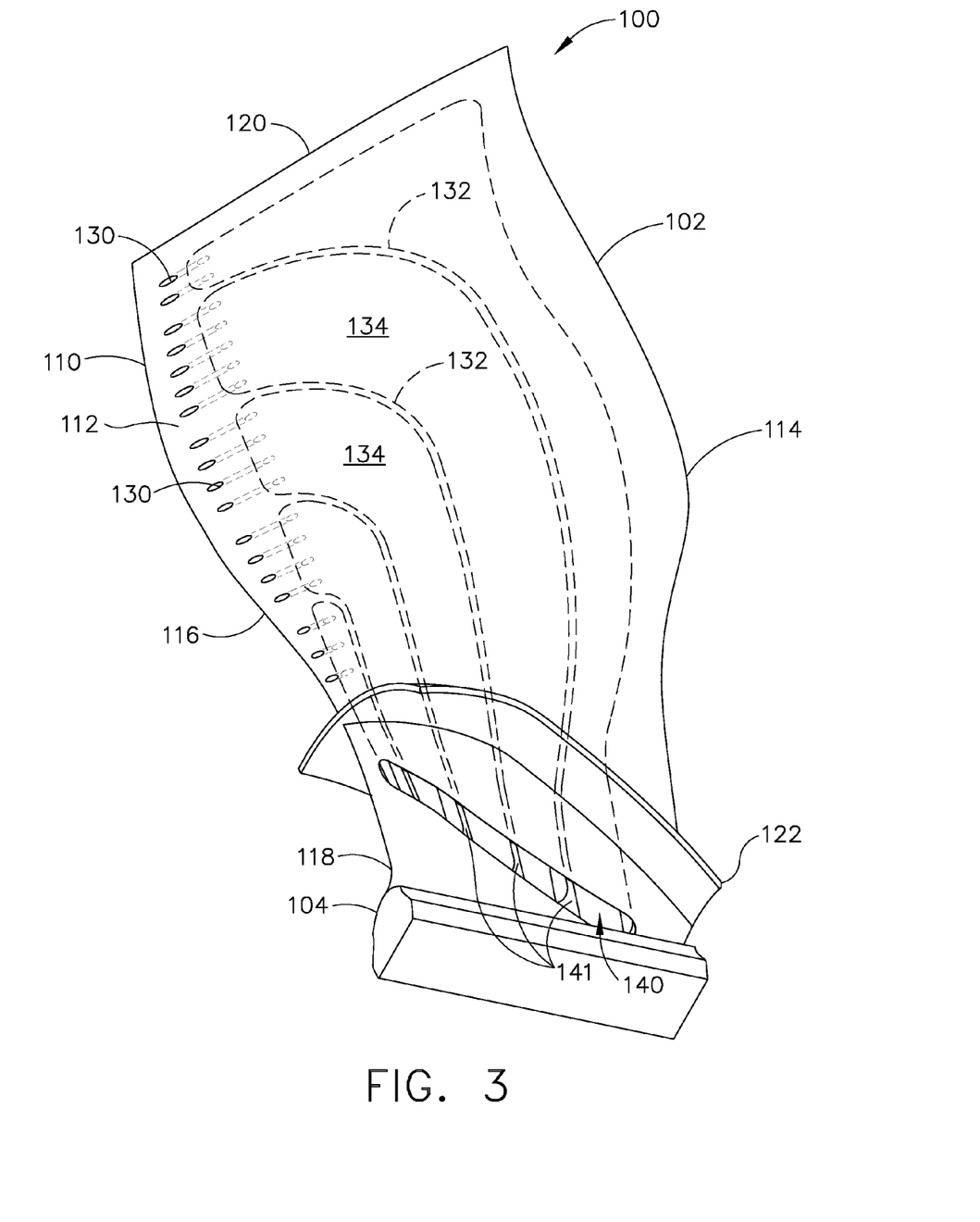
FIG. 3 is a perspective view of an exemplary fan blade that may be utilized with the turbofan engine shown in FIGS. 1 and 2.
Figure 4:
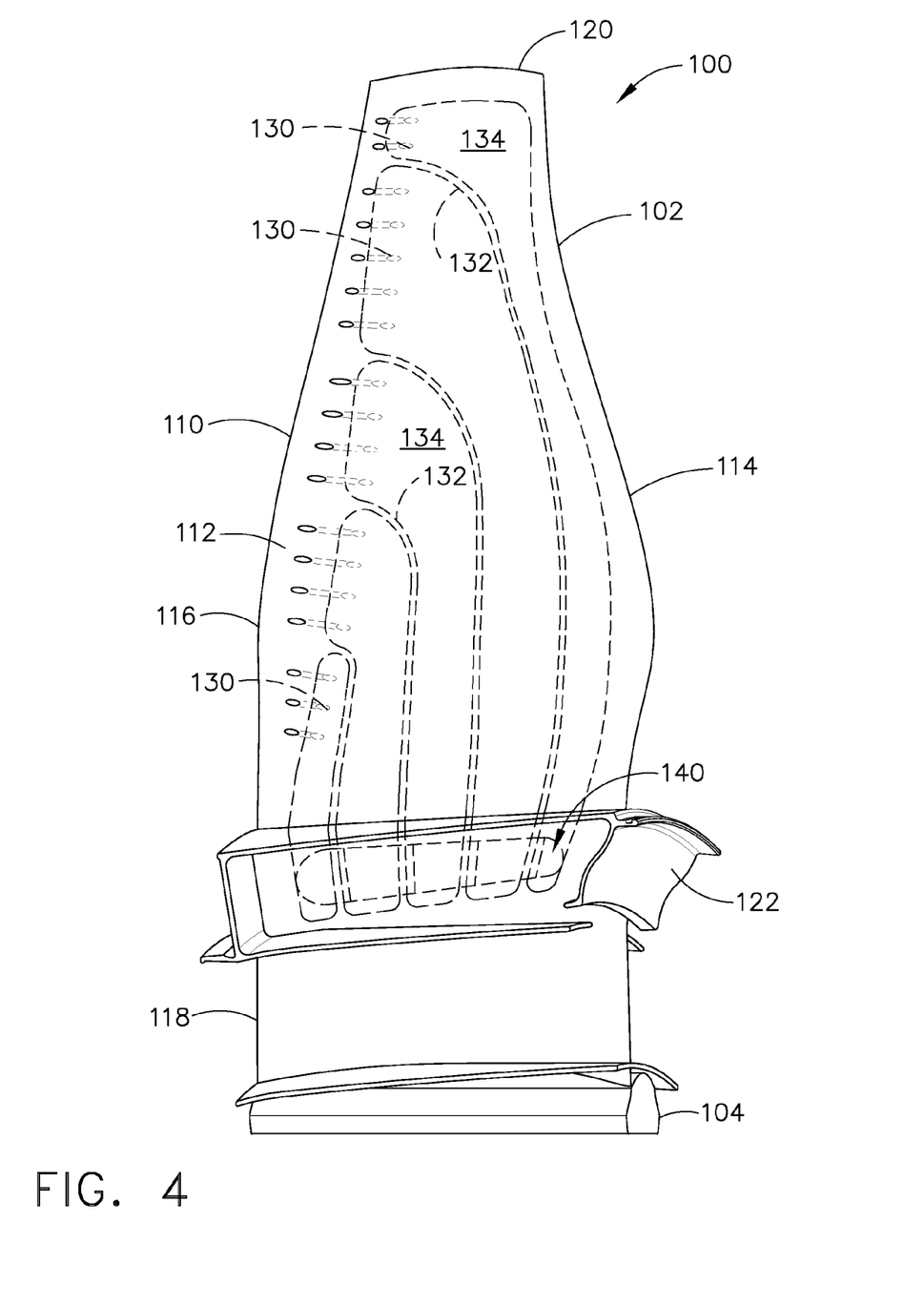
FIG. 4 is perspective view of another exemplary fan blade that may be utilized with the turbofan engine shown in FIGS. 1 and 2.

FIG. 3 is a perspective view of an exemplary fan blade 100 that may be utilized with either fan assembly 12 and/or fan assembly 14 shown in FIGS. 1 and 2. FIG. 4 is a perspective view of a second embodiment of fan blade 100 shown in FIG. 3 that may be utilized with either fan assembly 12 and/or fan assembly 14. Fan blade 100 includes an airfoil 102 and an integral dovetail 104 that is used for mounting fan blade 100 within a fan assembly, such as fan assembly 12 and/or fan assembly 14 (shown in FIG. 1). In the exemplary embodiment, the fan blades described herein are Super Plastic Formed and Diffusion Bonded (SPF/DB) rib core hollow titanium fan blades that are approximately 50% hollow at the root to provide a more robust fan blade and also to reduce overall engine weight. Additionally, the gas turbine engine includes improved sealing at the blade platforms, spinner and booster spool to minimize leakage.

Each airfoil 102 includes a first contoured sidewall 110 and a second contoured sidewall 112. First sidewall 110 is convex and defines a suction side of airfoil 102, and second sidewall 112 is concave and defines a pressure side of airfoil 102. Sidewalls 110 and 112 are joined at a leading edge 114 and at an axially spaced trailing edge 116 of airfoil 102. More specifically, airfoil trailing edge 116 is spaced chord wise and downstream from airfoil leading edge 114. First and second sidewalls 110 and 112, respectively, extend longitudinally or radially outward in span from a blade root 118 positioned adjacent dovetail 104 to an airfoil tip 120. A blade platform 122 is positioned above blade root 118 and extends in the axial direction radially outward from first and second sidewalls 110 and 112, respectively. In the exemplary embodiment, each fan blade 100 is fabricated utilizing a metallic material such as, but not limited to, titanium. In an alternative embodiment, each fan blade 100 is fabricated utilizing a composite material. Yet in another embodiment, each fan blade 100 is fabricated using a composite material embedded in a metallic frame.

As shown in FIGS. 3 and 4, fan blade 100 is substantially hollow such that airflow may be channeled through airfoil 102 and discharged through a plurality of trailing edge openings 130 that are formed proximate to airfoil trailing edge 116 to facilitate introducing pressurized air to the fan blade trailing edge and filling the wake, thus reducing and/or eliminating unsteady rotor wake/stator interaction and thus reducing the corresponding noise generated by turbofan engine assembly 10. More specifically, airfoil 102 include a plurality of ribs or stiffeners 132 that are coupled between first sidewall 110 and second sidewall 112 such that a plurality of airflow channels 134 are defined between at least some adjacent stiffeners 132. As such, airflow channels 134 are bounded within airfoil 102 between sidewall 110, sidewall 112, and stiffeners 132.

For example, airfoil 102 may be fabricated utilizing a core (not shown) that is cast into fan blade 100. The core may be fabricated by injecting a liquid ceramic and graphite slurry into a core die (not shown). The slurry is heated to form a solid ceramic plenum core. The core is suspended in a fan blade die (not shown) and hot wax is injected into the fan blade die to surround the ceramic core. The hot wax solidifies and forms a fan blade with the ceramic core suspended in the blade platform. The wax fan blade with the ceramic core is then dipped in a ceramic slurry and allowed to dry. This procedure is repeated several times such that a shell is formed over the wax fan blade. The wax is then melted out of the shell leaving a mold with a core suspended inside, and into which molten metal is poured. After the metal has solidified the shell is broken away and the core is removed to form fan blade 100, including the plurality of ribs or stiffeners 132 and the plurality of airflow channels 134 defined between first and second sidewalls 110 and 112, and stiffeners 132. In an alternative embodiment, one or all of airflow channels 134 and/or trailing edge openings 130 may be formed by drilling.

Fan blade 100 also includes an airflow inlet 140 that extends from an outer surface of airfoil 102 at least partially through airfoil 102. More specifically, and in the exemplary embodiment, airfoil inlet 140 is defined through second sidewall 112 such that airflow may be channeled through airfoil inlet 140 and into the plurality of channels 134. In the exemplary embodiment, airfoil 102 includes a single airfoil inlet opening 140 that is sized to channel airflow into the plurality of channels 134. Optionally, airfoil 102 includes a plurality of airfoil inlet openings 140 wherein each respective opening 140 is configured to channel airflow into a respective channel 134. As shown in FIGS. 3 and 4, each channel 134 extends from airflow inlet 140 radially outwardly through at least a portion of airfoil 102. Each channel 134 then extends axially rearwardly toward trailing edge 116 wherein the airflow is then channeled through the plurality of trailing edge openings 130.

Specifically, and in the exemplary embodiment, each respective channel 134 is in flow communication with a predetermined quantity of trailing edge openings 130 such that a predetermined volume of airflow is channeled through each respective channel 134 and discharged from each trailing edge opening 130 and such that the volume of airflow discharged from each trailing edge opening 130 is approximately equal to the volume of airflow discharged from the other trailing edge openings 130.

For example, as shown in FIGS. 3 and 4, each respective passage 134 is configured to channel airflow through a plurality of trailing edge openings 130. Optionally, the quantity of trailing edge openings 130 associated with each respective channel 134 may be varied to regulate the volume of airflow channeled past the trailing edge 116 to further improve noise reduction. For example, the radially outer channels 134 may be in flow communication with five or more openings 130 whereas the radially inner channels 134 may be in flow communication with four or less openings 130 to facilitate varying the volume of air discharged from the trailing edge openings 130.

Figure 5:
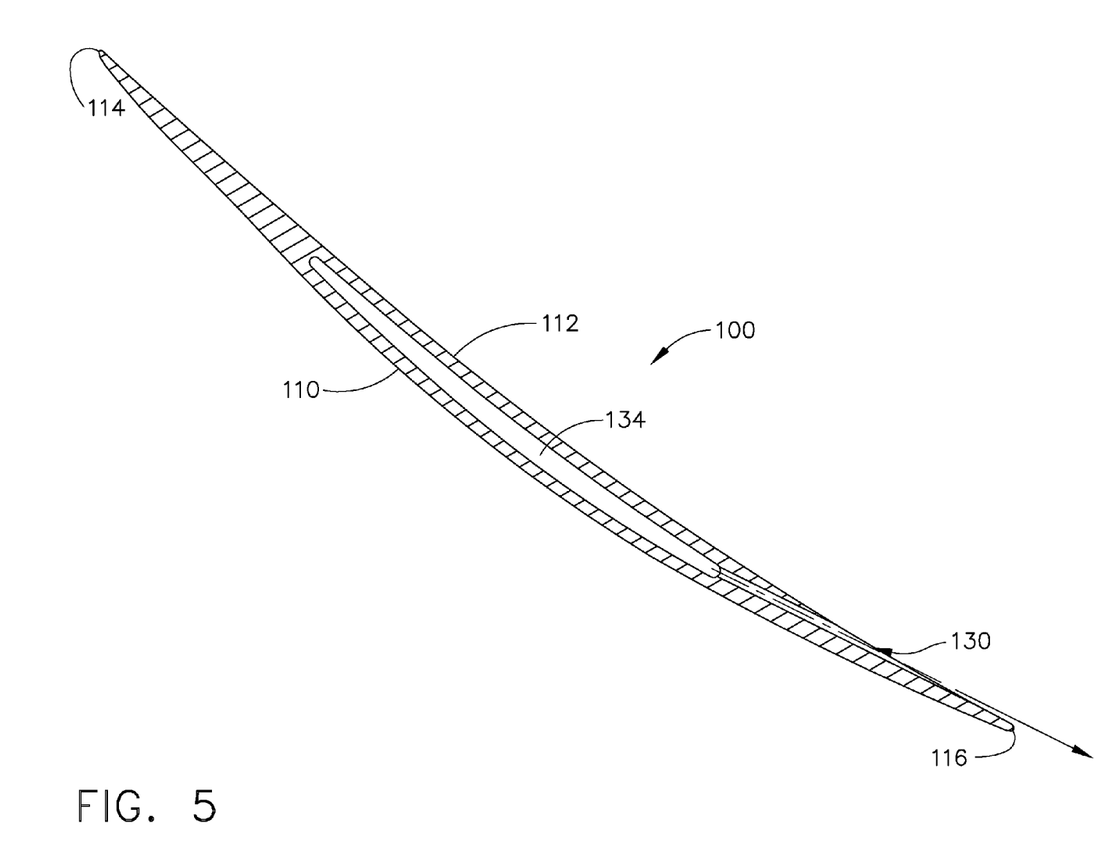
FIG. 5 is a top view of the fan blades shown in FIGS. 3 and 4.

FIG. 5 is a top view of the airfoil section rotated in plane near the blade tip along the blade. This enlarged view shows the cavity in the blade as well as the supply hole to the blade trailing edge. These holes are located spanwise and can exit at or adjacent to the airfoil trailing edge. The series of arrows shown at the trailing edge of each blade are representative of these holes.

Figure 6:
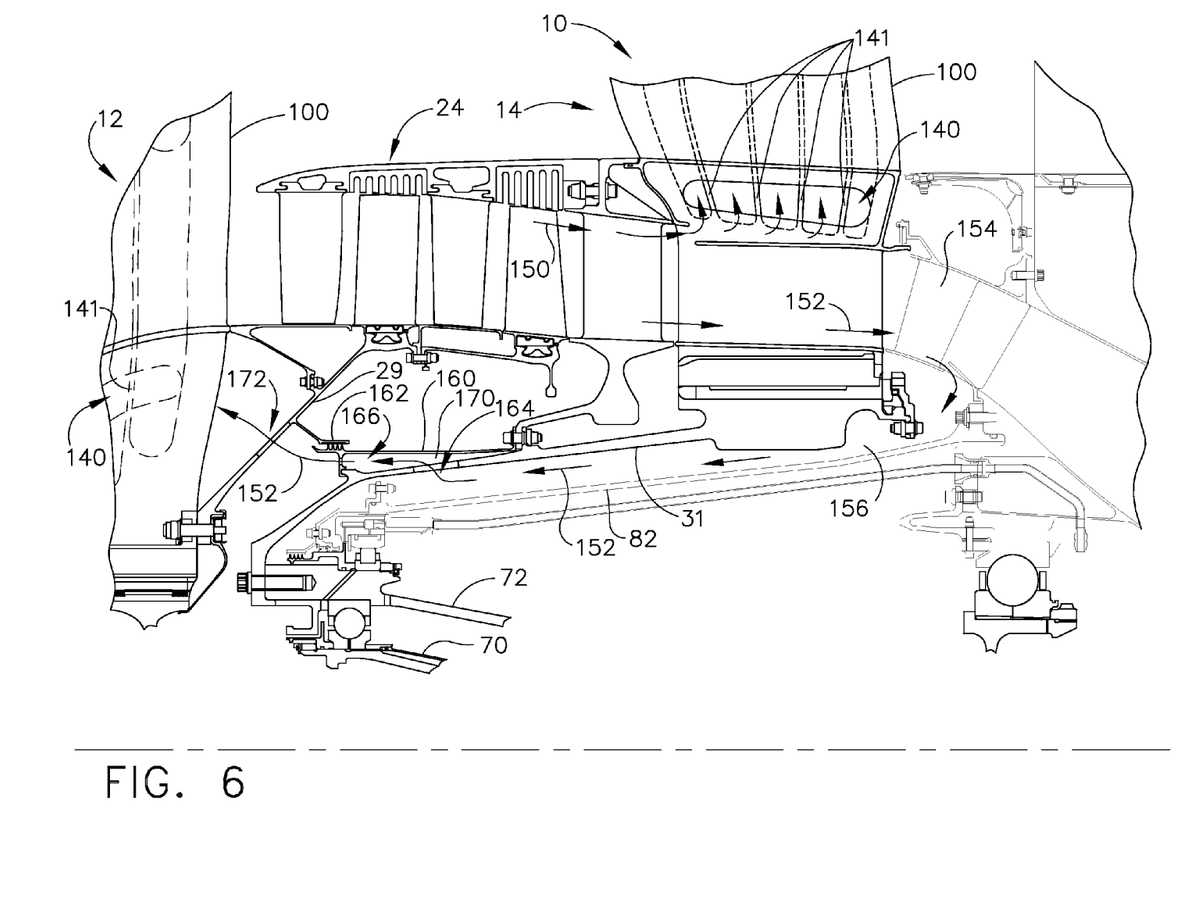
FIG. 6 is a cross-sectional view of a portion of the turbofan engine assembly shown in FIG. 1 including fan blades similar to the ones shown in FIGS. 3 and 4 during normal operation.

FIG. 6 is a schematic illustration of a portion of turbofan engine assembly 10, including fan blades 100 during normal operation. In operation, airflow discharged from fan assembly 12 is channeled downstream through booster compressor 24. A first portion 150 of the airflow discharged from booster compressor 24 is supplied through a plurality of fan blade louvers 141 which direct the airflow channeled into fan blade 100 via airfoil inlet 140 into passages 134, wherein the airflow is then discharged from fan blade 100 via trailing edge openings 130, shown in FIGS. 3, 4, and 5.

A second portion 152 of the airflow discharged from fan assembly 12 and/or 14 is then channeled through an outlet guide vane assembly 154 and into a passage 156 that is defined between aft fan assembly disk 31 and bearing support 82. More specifically, the second portion of airflow 152 is channeled axially forward through passage 156 such that the airflow is directed towards fan assembly 12. To facilitate channeling the second portion of airflow 152 to fan assembly 12, turbofan engine assembly 10 also includes a seal support structure 160, a labyrinth seal 162 that is coupled between seal support structure 160 and forward booster arm 29, at least one opening 164, and preferably a plurality of openings 164 that are defined through aft fan assembly disk 31, and a second plurality of openings 166 that are defined through seal support structure 160. During operation, second airflow portion 152 is channeled from passage 156, through openings 164 and into a cavity 170 that is defined between aft fan assembly disk 31 and seal support structure 160. The second airflow portion 152 is then discharged from cavity 170 through openings 166, through a plurality of openings 172 that are defined through booster arm 29, and into opening 140 of fan blade 100. The second airflow portion 152 channeled into fan blade 100 via airfoil inlet 140 is then discharged from fan blade 100 via trailing edge openings 130 shown in FIGS. 3, 4, and 5.

In the exemplary embodiment, forward fan 12 and/or aft fan 14 may each include at least one fan blade 100. For example, assuming fan assembly 12 or fan assembly 14 each include r fan blades, each fan assembly may include m known fan blades and n fan blades 100, wherein m+n=r. Optionally, fan assembly 12 and/or fan assembly 14 may be assembled to include n fan blades 100 wherein n=r.

Accordingly, to facilitate reducing engine noise, booster discharge air is bled through the fan frame struts at a rate that is approximately 1.2% of the total fan air at a temperature that is less than approximately 230 degrees Fahrenheit. The air is then channeled through the turbofan engine static structure wherein the compressed air is then channeled into the fan assemblies and directed into the fan blade dovetail. The compressed air then proceeds up the center of the fan blade, rearward and out the trailing edge of the blade. More specifically, air passing through the fan frame hub strut is discharged into a stationary, double walled plenum that envelops the forward sump and bearing housing. A rotating seal is located at the forward end of the plenum. In the exemplary embodiment, the seal is a labyrinth (as shown). Optionally, the seal may be either a brush or an aspirating seal. The compressed air is then channeled through the disk post slots and beneath the blade dovetails. As such, the fan assembly includes at least some fan blades 100, that is at least some known fan blades are replaced with fan blades 100 that are fabricated utilizing a hollow forged titanium spar with composite wrap or other equivalent design, fan blades.

Figure 7:
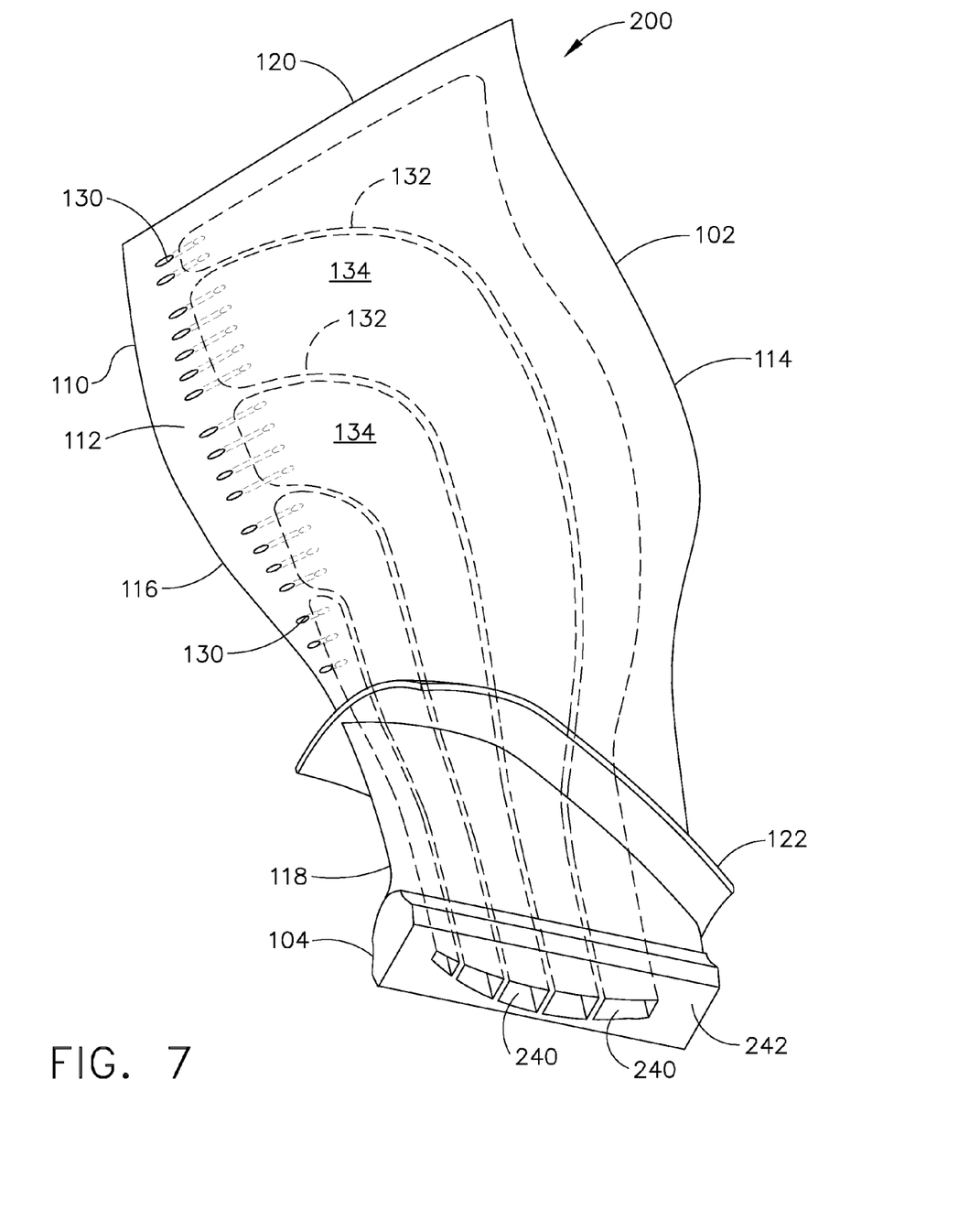
FIG. 7 is a perspective view of another exemplary fan blade that may be utilized with the fan assembly shown in FIGS. 1 and 2.

FIG. 7 is a perspective view of an exemplary fan blade 200 that may be utilized with either fan assembly 12 and/or fan assembly 14 shown in FIGS. 1 and 2. Fan blade 200 is substantially similar to fan blade 100. As such, similar features of fan blade 200 will be labeled utilizing the same numbers utilized to label fan blade 100. Fan blade 200 includes an airfoil 102 and an integral dovetail 104 that is used for mounting fan blade 200 to a rotor disk, such as rotor disk 13 and/or rotor disk 15 (shown in FIG. 1).

Similar to fan blade 100, the general configuration of each fan blade 200 may take any conventional form with or without the platform 122 or the dovetail 104. For example, fan blade 200 may be alternatively formed integrally with the disk 13 and/or 15 as one assembly conventionally referred to as a blisk without a discrete and removable dovetail 104. In the exemplary embodiment, each fan blade 200 is fabricated utilizing a metallic material such as, but not limited to, titanium. In an alternative embodiment, each fan blade 200 is fabricated utilizing a composite material. Yet in another embodiment, each fan blade 200 is fabricated using a composite material embedded in a metallic frame.

As illustrated in FIG. 7, fan blade 200 includes an airflow inlet 240 that extends from a lower surface 242 of dovetail 104 at least partially through airfoil 102. More specifically, and in the exemplary embodiment, airfoil inlet 240 is defined radially through dovetail 104 such that airflow may be channeled through airfoil inlet 240, through dovetail 104 and into the plurality of channels 134. In the exemplary embodiment, fan blade 200 includes a plurality of openings 240 wherein each respective opening 240 is configured to channel airflow into a respective channel 134. Optionally, fan blade 200 includes a single opening 240 that is sized to channel airflow into the plurality of channels 134. As shown in FIG. 7, each channel 134 extends from opening 240 radially outwardly through at least a portion of airfoil 102. Each channel 134 then extends axially rearwardly toward trailing edge 116 wherein the airflow is then channeled through plurality of trailing edge openings 130.

Figure 8:
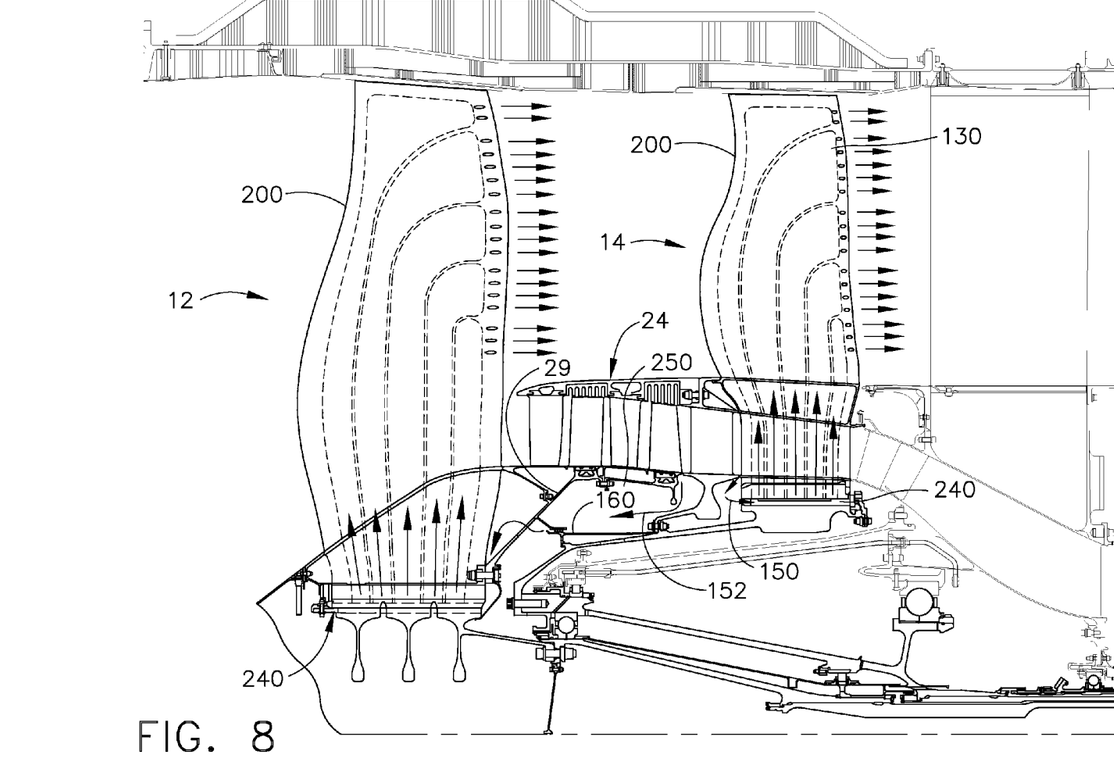
FIG. 8 is a cross-sectional view of a portion of the turbofan engine assembly shown in FIG. 1 including fan blades similar to the ones shown in FIG. 7 during normal operation.

Similarly to FIG. 6, FIG. 8 is a schematic illustration of a portion of turbofan engine assembly 10, including at least some fan blades 200 during normal operation. In operation, airflow discharged from fan assembly 12 is channeled downstream through booster compressor 24. A first portion 150 of the airflow discharged from booster compressor 24 is channeled into fan blade 200 via airfoil inlet 240 and then discharged from fan blade 200 via trailing edge openings 130. A second portion 152 of the airflow discharged from fan assembly 12 flows into a passage 250 that is defined between seal support structure 160 and forward booster arm 29. The second portion is then channeled into fan blade 200 via airfoil inlet 240 and then discharged from fan blade 200 via trailing edge openings 130.

In the exemplary embodiment, forward fan 12 and/or aft fan 14 may each include at least one fan blade 200. For example, assuming fan assembly 12 or fan assembly 14 each include r fan blades, each fan assembly may include m known fan blades and n fan blades 200 wherein m+n=r. Optionally, fan assembly 12 and/or fan assembly 14 may be assembled to include n fan blades 200 wherein n=r.

Exemplary embodiments of turbofan fan blades are described above in detail. The turbofan fan blades are not limited to the specific embodiments described herein, but rather, the fan blades may be utilized with a wide variety of turbofan engines to facilitate reducing engine noise. For example, although the exemplary embodiment, illustrates a turbofan engine including a counter-rotating turbine that is coupled to a counter-rotating fan assembly, it should be realized that the fan blades described herein may also be utilized with a non-counterrotating turbofan engine fan assembly. Moreover, initial analysis of the fan blade trailing edge blowing on several known gas turbine engines showed an improvement on Noise Cum (cumulative) margin of 2.56 effective perceived noise level (EPNdB) and 3.54 EPNdB respectively. The method incorporates existing technologies such as to minimize weight, cost and complexity, and also improves fan efficiency by approximately 0.65 to 0.85 points. The study completed demonstrated that the system can be applied to advanced, counter-rotating fan engines.

As discussed above, at least some known turbofan engine incorporate Wide Chord Fan blades for improved performance, however, no known turbofan engines incorporate trailing edge blowing in the fan blade design to reduce overall engine noise levels. Specifically, described herein is a high bypass turbofan engine that includes a first row of fan blades with conventional dovetails. Coupled downstream from the first row of fan blades is a 4 stage inter-digitated, counter rotating booster. Downstream from the booster compressor is a second row of fan blades. In the exemplary embodiment, the fan blades are fabricated using a solid composite with no means for providing Trailing Edge Blowing. In this configuration, it is assumed that booster discharge is a sufficient source of air pressure to supply both rows of fan blades. The booster is 40% oversized to provide the required fan flow.

During operation, booster discharge air is bled from the outer core stream flowpath within the shank of the stage two blades at the rate of approximately 2.0% of total fan air. This air is provided into the fan rotor through the fan blade shank. This blade is hollow titanium with rib core construction or other configurations that feature these cavities through the blade. The ribs form passages to deliver air to the blade trailing edge. A slot provided on one side of the blade shank allows the air into the blade center. The air proceeds up the center of the blade, aft and out the blade trailing edge.

For the first row of fan blades, booster discharge air is bled from the inner diameter of the fan module booster exit guide vane. The first row of fan blades also include a series of louvers which capture bleed air as well as maintaining the structural integrity of the vane. The bleed air is routed between the stage 2 fan disk and the #1 bearing support at a rate of approximately 1.5% of total fan air. A row of holes is provided in the fan disk torque arm forward of the disk. An interstage seal minimizes the pressure loss across rotors. Holes are provided in the forward booster arm. Once the air is on board the first stage fan, it passes in a similar manner through the hollow titanium blade and out the trailing edge. To facilitate sealing portions of the turbofan engine from the fan and booster air and thus channel the air to the fan blades, the turbofan engine includes counter rotating interstage seals that may be a labyrinth, as shown, a brush seal and/or an aspirating seal based on sealing requirements.

In this embodiment, the fan blades are fabricated using Super Plastic Formed and Diffusion Bonded (SPF/DB) rib core hollow titanium and fabricated such that the fan blades are approximately 50% hollow at the root. Accordingly, the fan blades are resized compared to known fan blades, and the dovetails, disk and containment for this configuration have been modified to produce a more robust blade configuration resulting in reduced overall engine weight that includes improved sealing at the blade platforms, spinner and booster spool to minimize leakage.

As a result, initial analysis of the fan blade trailing edge blowing on several known gas turbine engines showed an improvement on Noise Cum (cumulative) margin of 2.56 effective perceived noise level (EPNdB) and 3.54 EPNdB respectively, and also improves fan efficiency by approximately 0.65 to 0.85 points. The method incorporates existing technologies such as to minimize weight, cost and complexity. The study completed demonstrated that the system can be applied to advanced, counter rotating fan engines.

While the invention has been described in terms of various specific embodiments, those skilled in the art will recognize that the invention can be practiced with modification within the spirit and scope of the claims.

What is claimed is:

1. A method for assembling a turbofan engine, said method comprising:
   providing a booster compressor configured to produce booster discharge air;
   providing a first fan disk forward of the booster compressor, the first fan disk configured to rotate in a first rotational direction;
   coupling a first fan blade to the first fan disk, the first fan blade including a first plurality of internal channels configured to:
      direct a first airflow through the first fan blade, wherein the first airflow is bled from the booster discharge air and channeled axially toward the first fan disk; and
      discharge the first airflow proximate a trailing edge of the first fan blade;
   providing a second fan disk aft of the booster compressor and downstream from the first fan disk, wherein the second fan disk is configured to rotate in a second rotational direction that is opposite the first rotational direction; and
   coupling a second fan blade to the second fan disk, the second fan blade including a second plurality of channels configured to:
      receive a second airflow that is bled from the booster discharge air; and
      direct the second airflow through the second fan blade; and
      discharge the second airflow proximate a trailing edge of the second fan blade.

2. The method in accordance with claim 1, wherein coupling a first fan blade to the first fan disk comprises coupling a plurality of first fan blades to the first fan disk, each respective first fan blade including a dovetail, an airfoil coupled to the dovetail, and the first plurality of channels extending through the dovetail such that each first fan blade of the plurality of first fan blades is configured to receive a portion of the first airflow bled from the booster discharge air.

3. The method in accordance with claim 1, further comprising providing a counter-rotating turbine assembly downstream of the booster compressor, the counter-rotating turbine assembly including an inner rotor having a first plurality of rows of turbine blades configured to rotate in the first rotational direction, and an outer rotor including a second plurality of rows of turbine blades configured to rotate in the second direction.

4. The method in accordance with claim 1, wherein providing a booster compressor comprises providing the booster compressor as a counter-rotating booster compressor.

5. The method in accordance with claim 2, further comprising providing the airfoil with an inlet opening and a plurality of trailing edge openings, the inlet opening in flow communication with the first plurality of channels and extending through a first sidewall of the airfoil, the plurality of trailing edge openings in flow communication with one first channel of the plurality of first channels to facilitate channeling the portion of the first airflow bled from the booster discharge air through the inlet opening and the one first channel of the plurality of first channels and discharging the portion of the first airflow through the plurality of trailing edge openings.

6. A turbofan engine fan blade comprising:
   a dovetail;
   a tip;
   a first sidewall and a second sidewall extending from said dovetail to said tip, said first and second sidewalls coupled together to form a leading edge and a trailing edge;
   a platform extending outwardly from said first and second sidewalls proximate said dovetail to define a root section between said dovetail and said platform, said platform defining an aperture proximate the leading edge, said root section comprising an inlet formed in said first sidewall to facilitate admitting a circumferential flow of compressed air into said blade, wherein the flow of compressed air is bled from booster discharge air and through said aperture; and
   a plurality of airflow channels disposed between said first and second sidewalls, said airflow channels configured to receive the compressed airflow through said inlet and to discharge the compressed airflow proximate said trailing edge.

7. The fan blade in accordance with claim 6, wherein said airflow channels extend radially outwardly from said root towards said tip.

8. The fan blade in accordance with claim 7, wherein said airflow channels extend axially rearwardly toward said trailing edge.

9. The fan blade in accordance with claim 6, further comprising a plurality of louvers configured to channel the compressed airflow from said inlet into said plurality of airflow channels.

10. The fan blade in accordance with claim 6, wherein said fan blade is fabricated from at least one of a titanium material and a composite material.

11. A fan assembly for a gas turbine engine including a booster compressor configured to produce booster discharge air, said fan assembly comprising:
   a first fan configured to be disposed forward of the booster compressor, said first fan rotatable in a first rotational direction;
   a second fan configured to be disposed aft of the booster compressor, said second fan rotatable in a second rotational direction that is opposite the first rotational direction;
   said first fan and said second fan comprising a plurality of blades, wherein each of said blades comprises an airfoil comprising a base, a first sidewall and a second sidewall extending from said base and coupled together to form a leading edge and a trailing edge, and a plurality of airflow channels disposed between said first and second sidewalls, said airflow channels configured to receive a compressed airflow at a location proximate said base and to discharge the compressed airflow from a location proximate said trailing edge,
   wherein the airflow channels of said first fan are configured to receive a first airflow that is bled from the booster discharge air and channeled axially forward, and the airflow channels of said second fan are configured to receive a second airflow that is bled from the booster discharge air.

12. The fan assembly in accordance with claim 11, further comprising:
   a first turbine operatively coupled to said first fan and configured to rotate in the first rotational direction; and
   a second turbine operatively coupled to said second fan and configured to rotate in the second rotational direction.

13. The fan assembly in accordance with claim 11, wherein each of said blades further comprises an inlet opening that extends through said first sidewall to facilitate channeling airflow through said inlet opening and into said plurality of airflow channels.

14. The fan assembly in accordance with claim 13, wherein each of said blades further comprises a plurality of louvers configured to channel compressed airflow from said inlet opening into said plurality of airflow channels.

* * * * *